United States Patent
Kang et al.

(10) Patent No.: US 8,747,967 B2
(45) Date of Patent: Jun. 10, 2014

(54) LIQUID CRYSTAL DISPLAY

(75) Inventors: Suk Hoon Kang, Seoul (KR); Jun Woo Lee, Seongnam-si (KR); Baek Kyun Jeon, Yongin-si (KR); Kyoung Tae Kim, Osan-si (KR); Soo-Ryun Cho, Gunpo-si (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 13/433,009

(22) Filed: Mar. 28, 2012

(65) Prior Publication Data

US 2013/0063688 A1 Mar. 14, 2013

(30) Foreign Application Priority Data

Sep. 9, 2011 (KR) .................. 10-2011-0092083

(51) Int. Cl.
*G02F 1/1337* (2006.01)

(52) U.S. Cl.
USPC ............ 428/1.26; 428/1.1; 428/1.2; 349/123; 349/130

(58) Field of Classification Search
CPC .... C09J 179/04; C09J 179/08; C09J 179/085; C08J 2377/00; C08J 2379/00; C08J 2379/02; C08J 2379/04; C08J 2379/08; C08J 2479/00; C08J 2479/04; C08J 2479/08; C08G 73/14; C08G 73/16; C08L 79/04; C08L 79/08; C08L 79/085; C09K 19/56
USPC ........... 428/1.1, 1.2, 1.25–1.28; 349/123–136
See application file for complete search history.

(56) References Cited

U.S. PATENT DOCUMENTS

| | | | |
|---|---|---|---|
| 2006/0051524 A1* | 3/2006 | Gibbons et al. ................ | 428/1.2 |
| 2009/0226629 A1* | 9/2009 | Yen et al. ....................... | 427/510 |
| 2009/0237603 A1 | 9/2009 | Takeshita et al. | |
| 2009/0290109 A1* | 11/2009 | Lee et al. ....................... | 349/123 |
| 2010/0085523 A1* | 4/2010 | Terashita et al. ............... | 349/123 |
| 2010/0128214 A1 | 5/2010 | Lee et al. | |
| 2010/0136264 A1* | 6/2010 | Lee et al. ....................... | 428/1.26 |
| 2010/0182556 A1* | 7/2010 | Oh et al. ........................ | 349/127 |
| 2011/0051026 A1* | 3/2011 | Kim et al. ...................... | 349/42 |
| 2011/0199566 A1* | 8/2011 | Mazusaki et al. .............. | 349/123 |
| 2011/0234955 A1* | 9/2011 | Mizusaki et al. .............. | 349/123 |

FOREIGN PATENT DOCUMENTS

| | | | | |
|---|---|---|---|---|
| KR | 10-2010-0060365 | | 6/2010 | |
| WO | WO 2010047011 A1 * | | 4/2010 | ............... C08F 2/44 |
| WO | WO 2010061491 A1 * | | 6/2010 | ............ C08G 73/10 |
| WO | WO 2011/105575 A1 * | | 9/2011 | ........... G02F 1/1337 |

OTHER PUBLICATIONS

Yamanouchi et al., WO 2011/105575 A1 English Translation, WIPO Patentscope Machine Translation, Apr. 11, 2013.*

* cited by examiner

*Primary Examiner* — Gwendolyn Blackwell
*Assistant Examiner* — Eli D Strah
(74) *Attorney, Agent, or Firm* — H.C. Park & Associates, PLC (57) ABSTRACT

A liquid crystal display according to an exemplary embodiment of the present invention includes a first substrate and a second substrate facing each other, an alignment layer disposed on at least one of the first substrate or the second substrate, the alignment layer including at least one vertical alignment monomer and a photo-alignment layer separated from the at least one vertical alignment monomer, and a liquid crystal layer disposed between the first substrate and the second substrate. The photo-alignment layer includes a main chain and at least one side chain connected to the main chain, and the at least one side chain includes at least one vertical photo-alignment material.

16 Claims, 5 Drawing Sheets

LIQUID CRYSTAL DISPLAY

CROSS-REFERENCE TO RELATED APPLICATION

This application claims priority from and the benefit of Korean Patent Application No. 10-2011-0092083, filed on Sep. 9, 2011, which is hereby incorporated by reference for all purposes as if fully set forth herein.

BACKGROUND OF THE INVENTION

1. Field of the Invention

Exemplary embodiments of the present invention relate to a liquid crystal display.

2. Discussion of the Background

Among display panels, a liquid crystal display (LCD) is one type of flat panel display that is currently being widely used, and may include two display panels in which field generating electrodes such as a pixel electrode and a common electrode are formed, with a liquid crystal (LC) layer disposed therebetween. The LCD may display images by applying voltages to the field-generating electrodes to generate an electric field in the LC layer that determines the orientation of LC molecules therein to adjust polarization of incident light.

An alignment layer may be formed on the inner surfaces of the two display panels to align LC molecules of the LC layer. If no voltage is applied to the field generating electrodes, the LC molecules may be aligned in a predetermined direction by way of the alignment layer. With the application of a voltage to the field generating electrodes, the LC molecules may be rotated in the direction of the electric field.

The above information disclosed in this Background section is only for enhancement of understanding of the background of the invention and therefore it may contain information that does not form any part of the prior art.

SUMMARY OF THE INVENTION

Exemplary embodiments of the present invention provide a liquid crystal display including an alignment layer.

Exemplary embodiments of present invention also provide an alignment layer including at least one kind of vertical alignment monomer and a photo-alignment layer separated from the at least one kind of vertical alignment monomer.

Additional features of the invention will be set forth in the description which follows, and in part will be apparent from the description, or may be learned by practice of the invention An exemplary embodiment of the present invention discloses a liquid crystal display including a first substrate and a second substrate facing each other, an alignment layer disposed on at least one of the first substrate or the second substrate, the alignment layer including at least one vertical alignment monomer and a photo-alignment layer separated from the at least one vertical alignment monomer, and a liquid crystal layer disposed between the first substrate and the second substrate, wherein the photo-alignment layer includes a main chain and at least one side chain connected to the main chain, and the at least one side chain includes at least one vertical photo-alignment material.

An exemplary embodiment of the present invention discloses a liquid crystal display including a first substrate and a second substrate facing each other, an alignment layer disposed on at least one of the first substrate or the second substrate, the alignment layer including at least one vertical photo-alignment monomer and a photo-alignment layer separated from the at least one vertical photo-alignment monomer, and a liquid crystal layer disposed between the first substrate and the second substrate, wherein the photo-alignment layer includes a main chain and at least one side chain connected to the main chain, and the at least one side chain includes at least one vertical photo-alignment material and at least one vertical alignment material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The present invention will be described more fully hereinafter with reference to the accompanying drawings, in which exemplary embodiments of the present invention are shown. As those skilled in the art would realize, the described exemplary embodiments may be modified in various different ways, all without departing from the spirit or scope of the present invention. In the drawings, irrelevant portions are omitted to clearly describe the present invention, and like reference numerals designate like elements throughout the specification. Furthermore, detailed descriptions are not given to the well-known arts.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. Meanwhile, when an element is referred to as being "directly on" another element, there are no intervening elements present. In contrast, it will be understood that when an element such as a layer, film, region, or substrate is referred to as being "beneath" another element, it can be directly beneath the other element or intervening elements may also be present. Further, when an element is referred to as being "directly beneath" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

In the present specification, unless otherwise specifically stated, the term "substituted" means that something is substituted by a halogen, a C1-C12 haloalkyl group, a C1-C2 alkyl group, a C1-C12 alkoxy group, a C6-C12 aryl group, or a C6-C12 aryloxy group.

Figure 1:
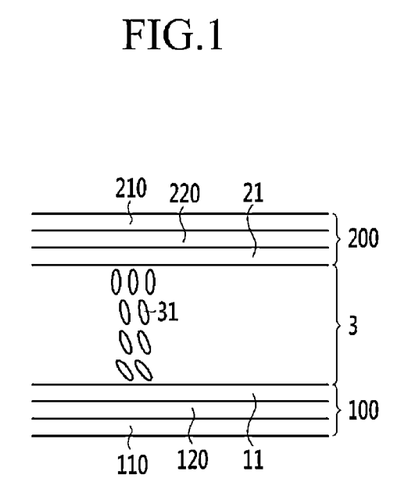
FIG. 1 is a cross-sectional view of a liquid crystal display according to an exemplary embodiment of the present invention.
Figure 2:
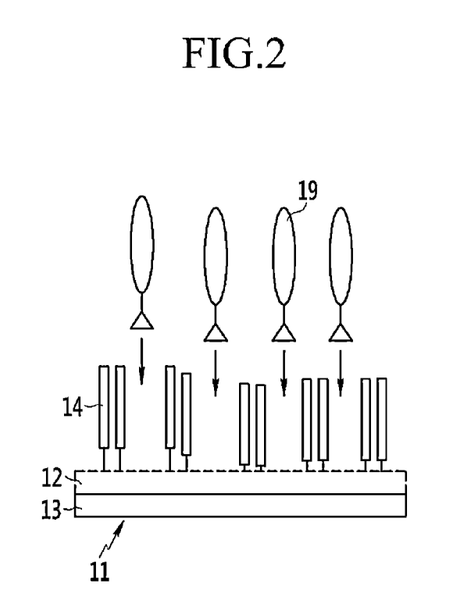
FIG. 2 is a cross-sectional view of an alignment layer according to an exemplary embodiment of the present invention.
Figure 3:
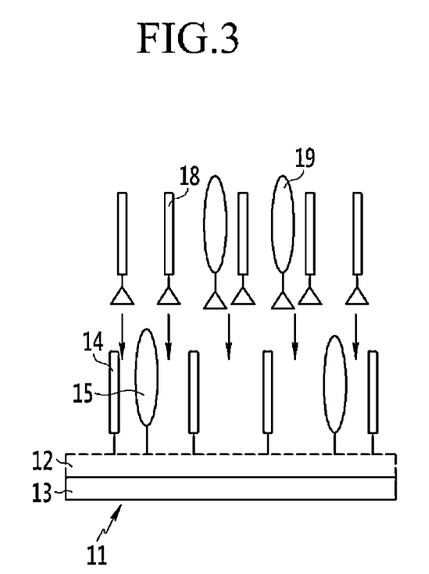
FIG. 3 is a cross-sectional view of an alignment layer according to an exemplary embodiment of the present invention.

FIG. 1 is a cross-sectional view of a liquid crystal display according to an exemplary embodiment of the present invention, FIG. 2 is a cross-sectional view of an alignment layer according to an exemplary embodiment of the present invention, and FIG. 3 is a cross-sectional view of an alignment layer according to an exemplary embodiment of the present invention.

Referring to FIG. 1, a liquid crystal display has a vertical alignment (VA) mode. The liquid crystal display includes a first display panel 100 and a second display panel 200 that face each other, and a liquid crystal layer 3 that is disposed between the first display panel 100 and the second display panel 200.

The first display panel 100 includes a first substrate 110. The first substrate 110 may have an insulation property. A first thin film layer 120 is disposed on the first substrate 110. The first thin film layer 120 may include at least one of a wiring layer, an electrode layer, an insulating layer, or a semiconductor layer. The first thin film layer 120 may include at least one of a light blocking layer or a color filter layer. The first thin film layer 120 may include a plurality of signal lines, a plurality of switching elements connected thereto such as thin film transistors, and a plurality of pixel electrodes connected to the switching elements. A first alignment layer 11 is disposed on the first thin film layer 120.

The second display panel 200 includes a second substrate 210. The second substrate 210 may have an insulation property. A second thin film layer 220 is disposed on the second substrate 210. The second thin film layer 220 may include at least one of a wiring layer, an electrode layer, an insulating layer, or a semiconductor layer. The second thin film layer 220 may include at least one of a light blocking layer or a color filter. The second thin film layer 220 may include an opposed electrode facing the pixel electrode of the first thin film layer 120. A second alignment layer 21 is disposed on the second thin film layer 220.

A liquid crystal material 31 of the liquid crystal layer 3 has dielectric anisotropy. The liquid crystal material 31 is aligned so as to be approximately vertical with respect to surfaces of the first substrate 110 and the second substrate 210, but may be tilted at a predetermined pretilt angle with respect to tangent lines of the surfaces of the first substrate 110 and the second substrate 210 at a point contacting the surfaces of the alignment layers 11 and 21.

A liquid crystal display includes a plurality of pixels PX that are each units for displaying an image. In order to realize a wide viewing angle, one pixel PX in the liquid crystal display having the vertical alignment (VA) mode may include a plurality of domains in which the alignment directions of the liquid crystal materials 31 are different from each other.

The description of the first alignment layer 11 provided below may also be applied to the second alignment layer 21.

Referring to FIG. 2 and FIG. 3, the first alignment layer 11 includes a normal alignment layer 13. The normal alignment layer 13 may be an alignment layer used in a twisted nematic (TN) mode. Also, the normal alignment layer 13 may be omitted. The first alignment layer 11 includes a polymerized photo-alignment layer 12. The photo-alignment layer 12 may be disposed on the normal alignment layer 13. The photo-alignment layer 12 includes at least one kind of vertical photo-alignment material 14, and may include at least one kind of vertical alignment material 15. Also, the photo-alignment layer 12 may include at least one kind of normal diamine. The first alignment layer 11 may include at least one of at least one kind of vertical alignment monomer 19 or at least one kind of vertical photo-alignment monomer 18.

Referring to FIG. 2, the photo-alignment layer 12 includes a main chain and a side chain connected to the main chain, and the side chain includes the vertical photo-alignment material 14 but does not include the vertical alignment material 15. Thereby, the density of the side chain of the photo-alignment layer 12 may be reduced, and as a result, polymerization of the photo-alignment layer 12 may be smooth. The photo-alignment layer 12 is less bulky such that reactivity of the photo-alignment layer 12 may be improved. The photo-alignment layer 12 does not include the vertical alignment material 15, however the first alignment layer 11 including the photo-alignment layer 12 includes the vertical alignment monomer 19 separated from the photo-alignment layer 12. The vertical alignment monomer 19 may improve the stability of the pretilt of the liquid crystal material 31. The side chain of the photo-alignment layer 12 includes the vertical photo-alignment material 14 such that a printing property of the alignment layer may be improved and spot generation may be reduced.

Referring to FIG. 3, the side chain of the photo-alignment layer 12 includes both of at least one kind of vertical photo-alignment material 14 and at least one kind of vertical alignment material 15, and the first alignment layer 11 includes at least one of at least one kind of vertical photo-alignment monomer 18 or at least one kind of vertical alignment monomer 19. The vertical photo-alignment monomer 18 and the vertical alignment monomer 19 are respectively separated from the photo-alignment layer 12. The photo-alignment layer 12 includes a small amount of the vertical photo-alignment material 14 and a small amount of the vertical alignment material 15, thereby the density of the side chain of the photo-alignment layer 12 may be reduced, and as a result, the polymerization of the photo-alignment layer 12 may be easy. The photo-alignment layer 12 is less bulky such that reactivity of the photo-alignment layer may be improved. For example, the photo-alignment layer 12 of FIG. 3 includes less of the vertical photo-alignment material 14 than the photo-alignment layer 12 of FIG. 2. The vertical photo-alignment monomer 18 and the vertical alignment monomer 19 may improve the stability of the pretilt of the liquid crystal material 31. The side chain of the photo-alignment layer 12 includes the vertical photo-alignment material 14 and the vertical alignment material 15 such that a printing property of the alignment layer may be improved and spot generation may be reduced.

The first alignment layer 11 of FIG. 2 includes the vertical photo-alignment material 14, and the first alignment layer 11 of FIG. 3 includes the vertical photo-alignment material 14 and the vertical alignment material 15. The first alignment layer 11 of FIG. 2 or FIG. 3 has a side chain with lower density than an alignment layer that does not include a separable vertical alignment monomer 19 and a separable vertical photo-alignment monomer 18, such that synthesis of the first alignment layer 11 may be easier. The main chain is elongated in the first alignment layer 11 such that the molecular weight thereof may be increased. Accordingly, the molecular weight of the photo-alignment layer 12 is controllable. Also, non-homogeneity of the photo-alignment layer 12 polymer due to a difference of the reactivity between the vertical photo-alignment material 14 and the vertical alignment material 15 is decreased such that a homogeneous photo-alignment layer 12 may be synthesized. For example, the surface of the first alignment layer 11 may be more uniform. Also, in the first alignment layer 11, the vertical photo-alignment material 14 may be mainly distributed in the surface, the usage of the vertical photo-alignment material 14 may be minimized, afterimages and scum may be reduced, and electrical characteristics thereof may be improved.

In the first alignment layer 11 of FIG. 2 or FIG. 3, the vertical photo-alignment material 14 and the vertical alignment material 15 are integrally coupled such that the stability of the first alignment layer 11 may be increased, a printing property thereof may be improved, and spot generation may be reduced. This is different from an alignment layer that includes separable vertical alignment monomer 19 and separable vertical photo-alignment monomer 18 and does not include the vertical photo-alignment material 14 and the vertical alignment material 15.

The photo-alignment layer 12 may include the vertical photo-alignment material 14 and the vertical alignment material 15, but the normal alignment layer 13 does not include both the vertical photo-alignment material 14 and the vertical alignment material 15. For example, the normal alignment layer 13 is a generally-used material for a VA mode liquid crystal display, a TN mode liquid crystal display, an in-plane switching (IPS) mode liquid crystal display, a fringe field switching (FFS) mode liquid crystal display, etc. In exemplary embodiments of the present invention, the photo-alignment layer 12 and the normal alignment layer 13 are in a microphase separation (MPS) state. The MPS state may be a structure in which a ratio of a molar concentration of the photo-alignment layer 12 to a molar concentration of the normal alignment layer 13 gradually increases closer to the surface of the alignment layer near the liquid crystal layer. When the photo-alignment layer 12 and the normal alignment layer 13 are mixed and coated on the first thin film layer 120 and the second thin film layer 220, the MPS state of the first alignment layer 11 and second alignment layer 21 may be generated. Next, when ultraviolet light is irradiated on the first alignment layer 11 and the second alignment layer 21 formed with the MPS, the first alignment layer 11 and the second alignment layer 21 are formed by the reaction of a photo-reactive functional group. Few side products due to the irradiation of ultraviolet light are produced in the first and second alignment layers 11 and 21, and afterimages of the LCD may be reduced. Also, the first and second alignment layers 11 and 21 are formed by the irradiation of ultraviolet light without an additional rubbing process such that the manufacturing cost may be reduced and the manufacturing speed may be increased.

The photo-alignment layer 12 may be primarily formed at the side of the surface of the alignment layer near the liquid crystal layer 3, and the normal alignment layer 13 may be primarily formed at the side close to the first and second substrates 110 and 210 in the alignment layer. Accordingly, for the first and second alignment layers 11 and 21, the ratio of the molar concentration of the photo-alignment layer 12 to the molar concentration of the normal alignment layer 13 may be gradually increased close to the surface of the alignment layer near the liquid crystal layer 3. Most of the vertical photo-alignment material 14 contained in the photo-alignment layer 12 may exist from the surface of the alignment layer to a predetermined depth. Here, the position of the vertical photo-alignment material 14 inside the alignment layer varies based on the ratio of the molar concentration of the photo-alignment layer 12 to the molar concentration of the normal alignment layer 13. For example, when the ratio of the molar concentration of the photo-alignment layer 12 to the molar concentration of the normal alignment layer 13 is about 5:95, most of the vertical photo-alignment material 14 may exist from the surface of the alignment layer to a depth of the alignment layer corresponding to about 5% of the entire thickness thereof. When the ratio of the molar concentration of the photo-alignment layer 12 to the molar concentration of the normal alignment layer 13 is about 20:80, most of the vertical photo-alignment material 14 may exist from the surface of the alignment layer to a depth of the alignment layer corresponding to about 20% of the entire thickness thereof. When the ratio of the molar concentration of the photo-alignment layer 12 to the molar concentration of the normal alignment layer 13 is about 50:50, most of the vertical photo-alignment material 14 may exist from the surface of the alignment layer to a depth of the alignment layer corresponding to about 50% of the entire thickness thereof.

The photo-alignment layer 12 is a polymer material with a weight average molecular weight of about 1000 to about 1,000,000 and includes at least one main chain and at least one side chain connected to the one main chain. The side chain may include at least one of a flexible functional group, a thermoplastic functional group, a photo-reactive group, and a vertical functional group. The main chain may include at least one compound selected from polyimide, polyamic acid, polyamide, polyamic-imide, polyester, polyethylene, polyurethane, or polystyrene. The main chain may contain a cyclic structure such as an imide group in order to further reinforce the rigidity of the main chain, and an electrical characteristic may be improved. The pre-tilt angle of the liquid crystal material by the alignment layer is about 90 degrees to about 100 degrees.

The photo-alignment layer 12 may be formed by polymerizing a monomer such as a diamine and an acid anhydride. Here, the diamine monomer includes a side chain to which a flexible functional group, a photo-reactive group, and a vertical functional group are coupled. For example, the diamine and the acid anhydride are reacted at 50 mol %:50 mol %, and thereby the polyimide group polymer or the polyamic acid group polymer may be polymerized. Also, at least one kind of diamine may be used for the formation of the photo-alignment layer 12, and at least one kind of acid anhydride may be used for the formation of the photo-alignment layer 12. For example, the photo-alignment layer 12 may be a homopolymer or a copolymer.

In detail, the diamine may be a photo-reactive diamine, a vertical diamine, or a normal diamine. At least one diamine among a photo-reactive diamine, a vertical diamine, or a normal diamine may be used for the formation of the photo-alignment layer 12. Also, at least one kind of photo-reactive diamine, at least one kind of vertical diamine, and at least one kind of normal diamine may be used to the formation of the photo-alignment layer 12. The vertical alignment property and the alignment stability thereof may be optimized by controlling the composition ratio of the copolymer of the photo-reactive diamine, the vertical diamine, and the normal diamine.

The photo-reactive diamine includes a diamine group, a flexible functional group, a photo-reactive group, and a vertical functional group. For example, in the photo-reactive diamine, the flexible functional group may be coupled to the diamine group, the photo-reactive group may be coupled to the flexible functional group, and the vertical functional group may be coupled to the photo-reactive group. The photo-reactive diamine may be represented by Chemical Formula 1. Also, the photo-reactive diamine may not include the flexible functional group. For example, when a diamine and an acid anhydride are polymerized, the vertical photo-alignment material 14 may include B, C, and D, and the photo-alignment material 14 may not include B.

[Chemical Formula 1]

In Chemical Formula 1, A is a substituted or unsubstituted $C_6$-$C_{24}$ aryl group or a substituted or unsubstituted $C_3$-$C_{24}$ cycloalkyl group, B is a flexible group, C is a photo-reactive functional group, and D is a vertical functional group.

For example, A may be a phenyl group, a cyclohexyl group, a biphenyl group, a naphtyl group, or a norbonene group. Examples of the flexible functional group, the photo-reactive functional group, and the vertical functional group will be described later.

The vertical diamine includes a diamine group, a flexible functional group, and a vertical functional group, but does not include the photo-reactive functional group. In the vertical diamine, the flexible group may be connected to the diamine group, and the vertical functional group may be connected to the flexible group. The vertical diamine may be represented by Chemical Formula 2. Also, the vertical diamine may not include the flexible functional group. For example, when a diamine and an acid anhydride are polymerized, the vertical alignment material 15 may include B and D, and the vertical alignment material 15 may not include B.

[Chemical Formula 2]

In Chemical Formula 2, A is a substituted or unsubstituted $C_6$-$C_{24}$ aryl group or a substituted or unsubstituted $C_3$-$C_{24}$ cycloalkyl group, B is a flexible group, and D is a vertical functional group.

For example, A may be a phenyl group, a cyclohexyl group, a biphenyl group, naphtyl group, or a norbonene group. Examples of the flexible functional group and the vertical functional group will be described later.

The normal diamine includes a diamine group, but does not include the photo-reactive functional group or the vertical functional group.

The diamine group may be represented by Chemical Formulae 3 to 11, and is not limited thereto.

[Chemical Formula 3]

[Chemical Formula 4]

[Chemical Formula 5]

[Chemical Formula 6]

[Chemical Formula 7]

[Chemical Formula 8]

[Chemical Formula 9]

[Chemical Formula 10]

[Chemical Formula 11]

The flexible group or thermosetting functional group is a functional group that can allow the side chain connected to the polymer main chain to be easily aligned.

For example, the flexible group or thermosetting functional group may include at least one of —O—, —OCO—, —COO—, —OR— (herein, R is H or a $C_1$-$C_5$ alkylene group), —R— (herein, R is a $C_1$-$C_5$ alkylene group), or an imide group, but is not limited thereto. In addition, the flexible group or thermosetting functional group may include a substituted or unsubstituted alkylene group or alkoxy group having about 3 to 20 carbon atoms.

The photo-reactive functional group is a functional group that directly causes a photodimerization reaction or a photoisomerization reaction by irradiation of ultraviolet light.

For example, the photo-reactive functional group may include at least one of an azo-based functional group, a cinnamate-based functional group, a chalcone-based functional group, a coumarin-based functional group, or a maleimide-based functional group, but is not particularly limited thereto.

The vertical functional group is a functional group that can move the entire side chain in an approximate vertical direction with respect to the main chain that is approximately parallel to the first substrate 110 or the second substrate 210.

For example, the vertical functional group may include at least one of an aryl group in which a $C_1$-$C_{25}$ alkyl group or an alkoxy group is substituted, a cyclohexyl group in which a $C_1$-$C_{25}$ alkyl group or an alkoxy group is substituted, a steroid group, a cholesteric group, or —R—(CH$_2$), but is not limited thereto.

In the vertical functional group, one or more aryl groups and one or more cyclohexyl groups may be directly connected to each other or through the C1-C5 alkylene group.

For example, an acid anhydride may be represented by the following Formulae 12 to 18, and is not limited thereto.

[Chemical Formula 12]

[Chemical Formula 13]

[Chemical Formula 15]

[Chemical Formula 16]

[Chemical Formula 17]

[Chemical Formula 18]

[Chemical Formula 19]

For example, the photo-alignment layer may be a polyamic acid type of compound represented by the following Formula 19 or a polyimide type of compound represented by the following Formula 20. A polyimide may be manufactured by imidizing a polyamic acid.

[Chemical Formula 19]

[Chemical Formula 20]

In Chemical Formula 19 and Chemical Formula 20, $A_5$-$A_8$ are independently a substituted or unsubstituted $C_6$-$C_{24}$ aryl group or a substituted or unsubstituted $C_3$-$C_{24}$ cycloalkyl group, B is a flexible group, C is a photo-reactive group, and D is a vertical functional group.

For example, $A_5$-$A_8$ may independently be a phenyl group, a cyclohexyl group, a biphenyl group, a naphtyl group, or a norbonene group.

The vertical photo-alignment monomer 18 includes a diamine group, a flexible functional group, a photo-reactive functional group, and a vertical functional group. For example, in the vertical photo-alignment monomer 18, the flexible functional group may be coupled to the diamine group, the photo-reactive functional group may be coupled to the flexible functional group, and the vertical functional group may be coupled to the photo-reactive functional group. The vertical photo-alignment monomer 18 may be represented by Chemical Formula 21. Also, the vertical photo-alignment monomer 18 may not include the flexible functional group.

$X\text{-}(A)_q\text{-}(B)_r\text{—}C\text{-}D$ [Chemical Formula 21]

In Chemical Formula 21, A is a substituted or unsubstituted $C_6$-$C_{24}$ aryl group or a substituted or unsubstituted $C_3$-$C_{24}$ cycloalkyl group, B is a flexible group, C is a photo-reactive functional group, D is a vertical functional group, q is 0 or 1, r is 0 or 1, and X is a thermo-reactive or photo-reactive group.

For example, X may be at least one of a silicon group, an acetylene group, or Chemical Formula 22 to 25.

[Chemical Formula 22]

[Chemical Formula 23]

[Chemical Formula 24]

[Chemical Formula 25]

In Chemical Formulae 24 and 25, $R_1$ and $R_2$ are a $C_1$-$C_5$ alkyl group.

The vertical alignment monomer 19 includes the diamine group, the flexible functional group, and the vertical functional group. For example, in the vertical alignment monomer 19, the flexible functional group may be coupled to the diamine group and the vertical functional group may be coupled to the flexible functional group. The vertical alignment monomer 19 may be represented by Chemical Formula 26. Also, the vertical alignment monomer 19 may not include the flexible functional group.

$X\text{-}(A)_s\text{-}(B)_t\text{-}D$ [Chemical Formula 26]

In Chemical Formula 26, A is a substituted or unsubstituted $C_6$-$C_{24}$ aryl group or a substituted or unsubstituted $C_3$-$C_{24}$ cycloalkyl group, B is a flexible group, D is a vertical functional group, s is 0 or 1, t is 0 or 1, and X is the thermo-reactive or photo-reactive group.

The photo-alignment layer 12 and the normal alignment layer 13 may be coupled by a cross-linking agent. When forming the first and second alignment layers 11 and 21 by using the cross-linking agent, the electrical characteristics and the chemical stability of the first and second alignment layers 11 and 21 may be improved. Furthermore, when using the cross-linking agent at less than about 30 wt %, the electrical characteristics and the chemical stability of the first and second alignment layers 11 and 21 may be further improved.

For example, the cross-linking agent may include Formula 27 to Formula 29 below, however it is not limited thereto.

[Chemical Formula 27]

[Chemical Formula 28]

[Chemical Formula 29]

In Formulae 27 to 29, $A_1$-$A_4$ are independently a substituted or non-substituted $C_6$-$C_{24}$ aryl group or a substituted or non-substituted $C_3$-$C_{24}$ cycloalkyl group, and n is 1 to 6.

For example, $A_1$-$A_4$ may independently be a phenyl group, a cyclohexyl group, a biphenyl group, a naphtyl group, or a norbonene group:

Next, the present invention will be described with reference to exemplary embodiments, however the following exemplary embodiments are only exemplary and the present invention is not limited thereto.

Comparative Example 1

A photo-alignment layer was synthesized by polymerizing 35 mol % of the photo-reactive diamine represented by the following Formula 30, 15 mol % of the vertical diamine including the cholesteric group, and 50 mol % of the acid anhydride represented by Formula 13. A normal alignment layer was synthesized by polymerizing 15 mol % of the normal diamine represented by the Chemical Formula 3, 35 mol % of the normal diamine represented by Chemical Formula 4, and 50 mol % of the acid anhydride represented by Chemical Formula 13. A composition was manufactured by mixing the photo-alignment layer and the normal alignment layer.

After the manufactured composition was coated on the first substrate 110 and the second substrate 210, ultraviolet light was irradiated to the first and second substrates 110 and 210 to respectively form first and second alignment layers 11 and 21 on the substrates. Next, the liquid crystal panel is manufactured by injecting the liquid crystal for the VA mode first and second substrates 110 and 220.

[Chemical Formula 30]

Comparative Example 2

A normal alignment layer was synthesized by polymerizing 15 mol % of the normal diamine represented by Chemical Formula 3, 35 mol % of the normal diamine represented by Chemical Formula 4, and 50 mol % of the acid anhydride represented by Chemical Formula 13. A composition was manufactured by adding 35 mol % of the vertical photo-alignment monomer represented by following Chemical Formula 31 and 15 mol % of the vertical alignment monomer including the cholesteric group and the functional group represented by Chemical Formula 22 to 50 mol % of the normal alignment layer.

After the manufactured composition was coated on the first substrate 110 and the second substrate 210, ultraviolet light was irradiated to the first and second substrates 110 and 210 to respectively form the first and second alignment layers 11 and 21. Next, the liquid crystal panel was manufactured by injecting the liquid crystal for the VA mode between the first and second substrates 110 and 220.

[Chemical Formula 31]

Exemplary Embodiment 1

A photo-alignment layer was synthesized by polymerizing 35 mol % of the photo-reactive diamine represented by Chemical Formula 30, 15 mol % of the normal diamine represented by Chemical Formula 3, and 50 mol % of the acid anhydride represented by Chemical Formula 13. The normal alignment layer was synthesized by polymerizing 15 mol % of the normal diamine represented by the Chemical Formula 3, 35 mol % of the normal diamine represented by Chemical Formula 4, and 50 mol % of the acid anhydride represented by Chemical Formula 13. When mixing the photo-alignment layer, the normal alignment layer, and the vertical alignment monomer including the cholesteric group and the functional group represented by Chemical Formula 22 to manufacture a composition, the mixture mole ratio of the photo-reactive diamine and the vertical alignment monomer was 7:3.

After the manufactured composition was coated on the first substrate 110 and the second substrate 210, ultraviolet light was irradiated to the first and second substrates 110 and 210 to respectively form first and second alignment layers 11 and 21. Next, the liquid crystal panel was manufactured by injecting the liquid crystal for the VA mode between the first and second substrates 110 and 220.

Molecular Weight and Pre-Tilt

The molecular weight for the composition of Comparative Examples 1 and 2 and Exemplary Embodiment 1 was measured, and the pre-tilt of the liquid crystal material for the liquid crystal panel of Comparative Examples 1 and 2 and Exemplary Embodiment 1 was measured. The measured results are shown in the following Table 1.

TABLE 1

|  | Comparative Example 1 | Comparative Example 2 | Exemplary Embodiment 1 |
|---|---|---|---|
| Molecular weight (g/mol) | 200,000 | 230,000 | 230,000 |
| Pre-tilt (degrees) | 1.5 | 1.7 | 1.9 |

Referring to Table 1, the molecular weight of Exemplary Embodiment 1 is larger than that of Comparative Example 1.

Electrical Characteristic Estimation

For the liquid crystal panel of Comparative Example 1 and 2 and Exemplary Embodiment 1, results of measuring a voltage holding ratio (VHR) and ion density are shown in the following Table 2.

TABLE 2

|  | Comparative Example 1 | Comparative Example 2 | Exemplary Embodiment 1 |
|---|---|---|---|
| VHR (%) | 99.1 | 99.3 | 99.3 |
| Ion density (pC) | 30 | 60 | 40 |

Referring to Table 2, the VHR of Exemplary Embodiment 1 is higher than that of Comparative Example 1.

Afterimage Estimation

For the liquid crystal panel of Comparative Examples 1 and 2 and Exemplary Embodiment 1, results of measuring black afterimages, surface afterimages, and line afterimages are shown in Table 3 below.

TABLE 3

|  | Comparative Example 1 | Comparative Example 2 | Exemplary Embodiment 1 |
|---|---|---|---|
| Black afterimages (level) | 3 | 3 | 3 |
| Surface afterimages (level) | 3 | 3 | 3 |
| Line afterimages (hour) | 980 | 1024 | 1220 |
| Spots (hour) | — | More than 2000 | — |

Referring to Table 3, in Exemplary Embodiment 1, the line afterimages are improved compared with Comparative Examples 1 and 2, and scum is not generated in Exemplary Embodiment 1.

Alignment Layer Printing Property and Spot Estimation

For the liquid crystal panel of Comparative Examples 1 and 2 and Exemplary Embodiment 1, results of measuring the printing property and the spots of the alignment layer are shown in FIG. 4A, FIG. 4B, FIG. 5A, and FIG. 5B.

Figure 4A:
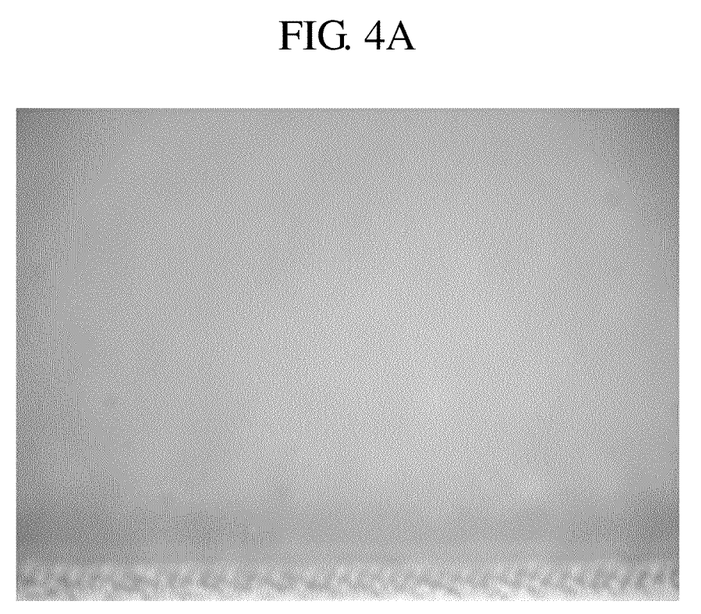
FIG. 4A and FIG. 4B are photos of a printing property of an alignment layer according to an exemplary embodiment of the present invention.
Figure 4B:
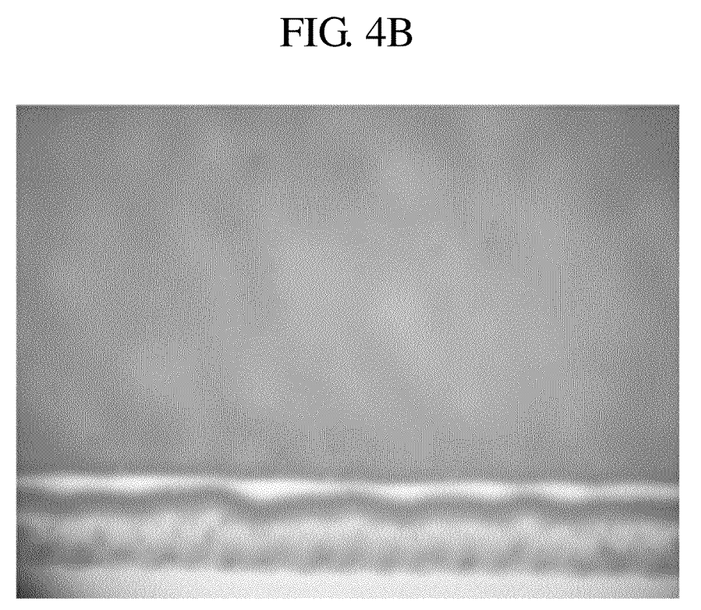
Figure 5A:
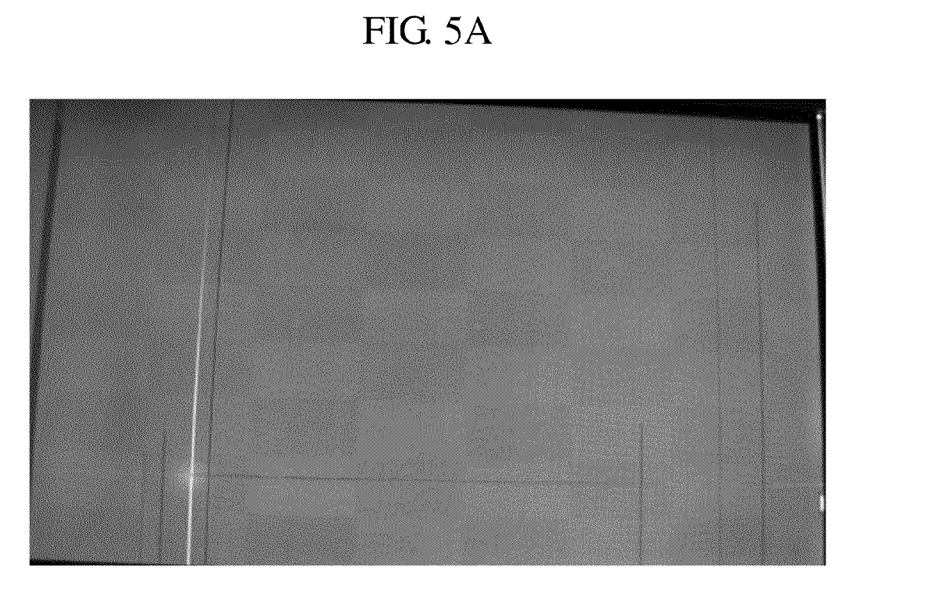
FIG. 5A and FIG. 5B are photos of spots of an alignment layer according to an exemplary embodiment of the present invention.
Figure 5B:
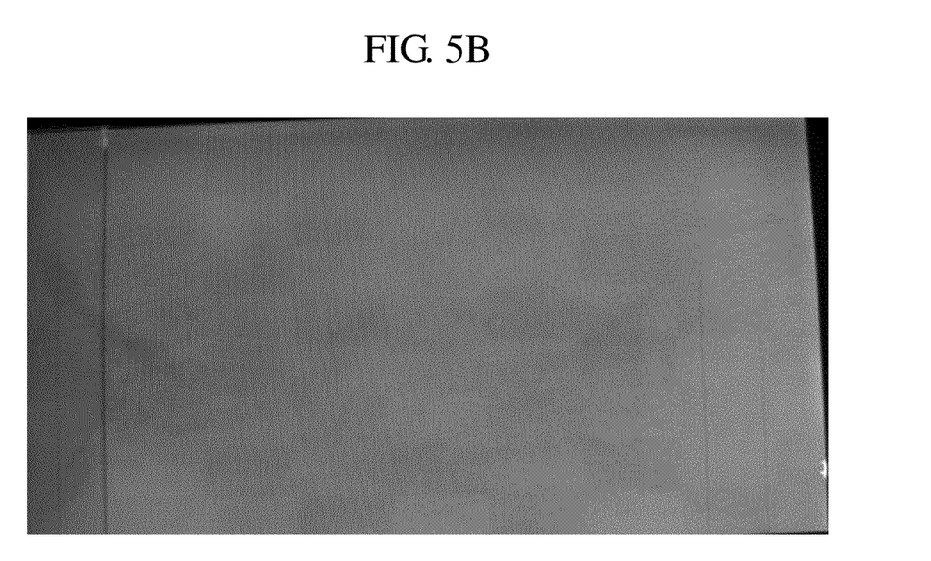

FIG. 4A shows a measuring result of the printing property of the liquid crystal panel of Exemplary Embodiment 1 and FIG. 4B shows a measuring result for the printing property of the liquid crystal panel of Comparative Example 2, and when comparing FIG. 4A with FIG. 4B, it may be confirmed that the printing property is improved. FIG. 5A shows a measuring result for the spots of the liquid crystal panel of Exemplary Embodiment 1 and FIG. 5B shows a measuring result for the spots of the liquid crystal panel of Comparative Example 2, and when comparing FIG. 5A with FIG. 5B, it may be confirmed that the spot generation is reduced.

A liquid crystal display according to an exemplary embodiment of the present invention may improve stability while reducing afterimages and spots of the liquid crystal display, and may improve the transmittance of the liquid crystal display.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a first substrate and a second substrate facing each other;
an alignment layer disposed on at least one of the first substrate or the second substrate, the alignment layer comprising at least one vertical alignment monomer and a photo-alignment layer separated from and not bound to the at least one vertical alignment monomer; and
a liquid crystal layer disposed between the first substrate and the second substrate,
wherein the photo-alignment layer comprises a main chain and at least one side chain connected to the main chain, and the at least one side chain comprises at least one vertical photo-alignment material,
wherein the at least one vertical alignment monomer and the photo-alignment layer form a single layer, and
wherein the at least one vertical alignment monomer is a compound represented by Chemical Formula 26:

$$X\text{-}(A)_s\text{-}(B)_t\text{-}D \quad \text{[Chemical Formula 26]}$$

wherein, in Chemical Formula 26, A is a substituted or unsubstituted $C_6$-$C_{24}$ aryl group or a substituted or unsubstituted $C_3$-$C_{24}$ cycloalkyl group, B is a flexible group, D is a first vertical functional group, s is 0 or 1, t is 0 or 1, and X is a thermo-reactive or photo-reactive group,
wherein the flexible group B comprises at least one of —O—, —OCO—, —COO—, —$OR_1$—, wherein $R_1$ is H or a $C_1$-$C_5$ alkylene group, —$R_2$—, wherein $R_2$ is a $C_1$-$C_5$ alkylene group, an imide group, and a substituted or unsubstituted alkylene group or alkoxy group having 3 to 20 carbon atoms,
wherein the first vertical functional group D comprises at least one of an aryl group in which a $C_1$-$C_{25}$ alkyl group or an alkoxy group is substituted, a cyclohexyl group in which a $C_1$-$C_{25}$ alkyl group or an alkoxy group is substituted, a steroid group, a cholesteric group, and —$R_3$—($CH_2$), wherein $R_3$ is a $C_1$-$C_5$ alkylene group, and
wherein the thermo-reactive or photo-reactive group X comprises at least one of a silicon group, an acetylene group, and Chemical Formulae 23 to 25:

[Chemical Formula 23]

[Chemical Formula 24]

[Chemical Formula 25]

wherein, in Chemical Formulae 24 and 25, $R_1$ and $R_2$ are $C_1$-$C_5$ alkyl groups.

2. The liquid crystal display of claim 1, wherein the at least one vertical photo-alignment material comprises a vertical functional group and a photo-reactive functional group.

3. The liquid crystal display of claim 1, wherein the alignment layer further comprises a normal alignment layer disposed under the photo-alignment layer.

4. The liquid crystal display of claim 3, wherein a ratio of a molar concentration of the photo-alignment layer to a molar concentration of the normal alignment layer gradually increases close to a surface of the alignment layer near the liquid crystal layer.

5. The liquid crystal display of claim 3, wherein the photo-alignment layer and the normal alignment layer are coupled by at least one cross-linking agent.

6. The liquid crystal display of claim 1, wherein the at least one side chain does not comprise a vertical alignment material, and the vertical alignment material comprises a vertical functional group but does not comprise a photo-reactive functional group.

7. The liquid crystal display of claim 6, wherein the alignment layer further comprises a normal alignment layer disposed under the photo-alignment layer.

8. The liquid crystal display of claim 7, wherein a ratio of a molar concentration of the photo-alignment layer to a molar concentration of the normal alignment layer gradually increases close to a surface of the alignment layer near the liquid crystal layer.

9. The liquid crystal display of claim 1, wherein the alignment layer comprises at least one vertical photo-alignment monomer.

10. The liquid crystal display of claim 1, wherein the at least one side chain comprises at least one vertical alignment material, and the at least one vertical alignment material comprises a vertical functional group but does not comprise a photo-reactive functional group.

11. The liquid crystal display of claim 10, wherein the alignment layer comprises at least one vertical photo-alignment monomer.

12. The liquid crystal display of claim 10, wherein the alignment layer further comprises a normal alignment layer disposed under the photo-alignment layer.

13. The liquid crystal display of claim 12, wherein a ratio of a molar concentration of the photo-alignment layer to a molar concentration of the normal alignment layer gradually increases close to a surface of the alignment layer near the liquid crystal layer.

14. The liquid crystal display of claim 1, wherein the photo-alignment layer comprises at least one normal diamine, and the at least one normal diamine does not comprise a vertical functional group or a photo-reactive functional group.

15. The liquid crystal display of claim 1, wherein the photo-alignment layer is a polyamic acid type of compound represented by Chemical Formula 19, or a polyimide type of compound represented by Chemical Formula 20:

[Chemical Formula 19]

[Chemical Formula 20]

wherein, in Chemical Formula 19 and Chemical Formula 20, $A_5$-$A_8$ are independently a substituted or unsubstituted $C_6$-$C_{24}$ aryl group or a substituted or unsubstituted $C_3$-$C_{24}$ cycloalkyl group, B is a flexible group, C is a photo-reactive group, and D is a vertical functional group, wherein the flexible group B comprises at least one of —O—, —OCO—, —COO—, —OR$_1$—, wherein $R_1$ is H or a $C_1$-$C_5$ alkylene group, —R$_2$—, wherein $R_2$ is a $C_1$-$C_5$ alkylene group, an imide group, and a substituted or unsubstituted alkylene group or alkoxy group having 3 to 20 carbon atoms, wherein the photo-reactive functional group C comprises at least one of an azo-based functional group, a cinnamate-based functional group, a chalcone-based functional group, a coumarin-based functional group, and a maleimide-based functional group, and wherein the first vertical functional group D comprises at least one of an aryl group in which a $C_1$-$C_{25}$ alkyl group or an alkoxy group is substituted, a cyclohexyl group in which a $C_1$-$C_{25}$ alkyl group or an alkoxy group is substituted, a steroid group, a cholesteric group, and —R$_3$—(CH$_2$), wherein $R_3$ is a $C_1$-$C_5$ alkylene group.

16. A liquid crystal display, comprising:
a first substrate and a second substrate facing each other;
an alignment layer disposed on at least one of the first substrate or the second substrate, the alignment layer comprising at least one vertical photo-alignment monomer and a photo-alignment layer separated from and not bound to the at least one vertical photo-alignment monomer; and
a liquid crystal layer disposed between the first substrate and the second substrate, wherein the photo-alignment layer comprises a main chain and at least one side chain connected to the main chain, and the at least one side chain comprises at least one vertical photo-alignment material and at least one vertical alignment material,
wherein the at least one vertical photo-alignment monomer and the photo-alignment layer form a single layer, and
wherein
the at least one vertical photo-alignment monomer is a compound represented by Chemical Formula 26:

X-(A)$_s$-(B)$_t$-D [Chemical Formula 26]

wherein, in Chemical Formula 26, A is a substituted or unsubstituted $C_6$-$C_{24}$ aryl group or a substituted or unsubstituted $C_3$-$C_{24}$ cycloalkyl group, B is a flexible group, D is a first vertical functional group, s is 0 or 1, t is 0 or 1, and X is a thermo-reactive or photo-reactive group, wherein the flexible group B comprises at least one of —O—, —OCO—, —COO—, —$OR_1$—, wherein $R_1$ is H or a $C_1$-$C_5$ alkylene group, —$R_2$—, wherein $R_2$ is a $C_1$-$C_5$ alkylene group, an imide group, and a substituted or unsubstituted alkylene group or alkoxy group having 3 to 20 carbon atoms, wherein the first vertical functional group D comprises at least one of an aryl group in which a $C_1$-$C_{25}$ alkyl group or an alkoxy group is substituted, a cyclohexyl group in which a $C_1$-$C_{25}$ alkyl group or an alkoxy group is substituted, a steroid group, a cholesteric group, and —$R_3$—($CH_2$), wherein $R_3$ is a $C_1$-$C_5$ alkylene group, and wherein the thermo-reactive or photo-reactive group X comprises at least one of a silicon group, an acetylene group, and Chemical Formulae 23 to 25:

[Chemical Formula 23]

[Chemical Formula 24]

[Chemical Formula 25]

wherein, in Chemical Formulae 24 and 25, $R_1$ and $R_2$ are $C_1$-$C_5$ alkyl groups.

* * * * *